L. WOJIDKOW.
PERCOLATOR.
APPLICATION FILED OCT. 17, 1912.
1,095,973.
Patented May 5, 1914.
2 SHEETS—SHEET 2.
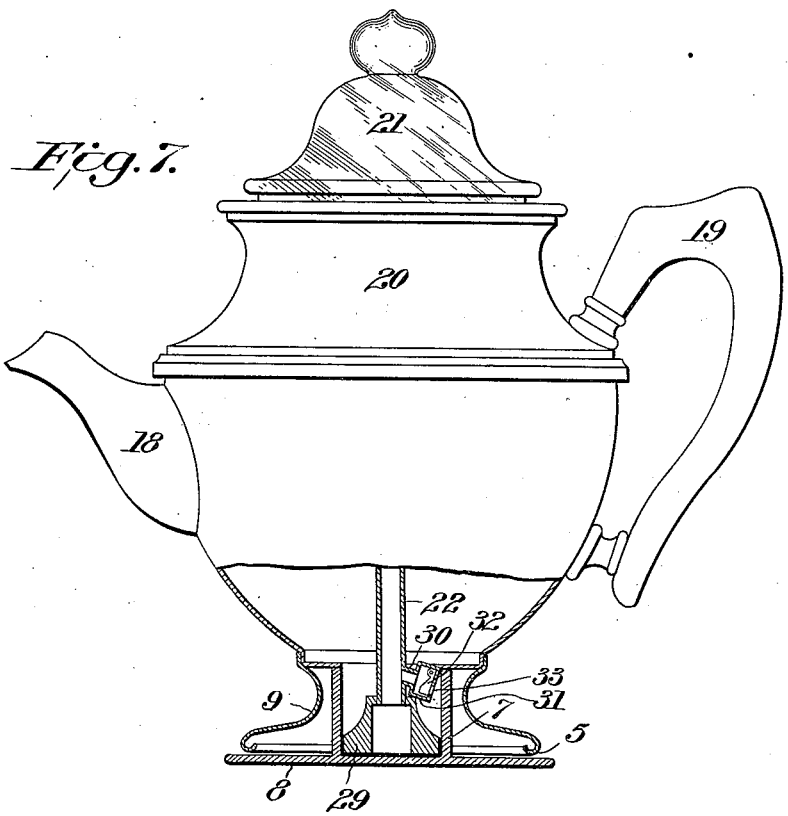
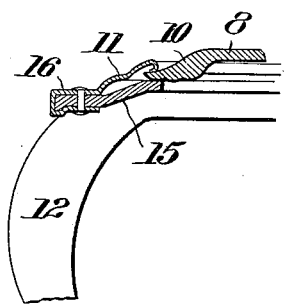
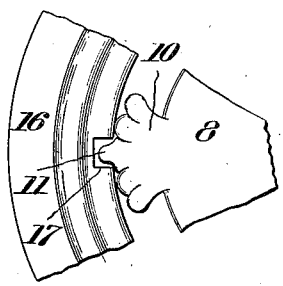
Witnesses
Inventor
Louis Wojidkow
Attorney

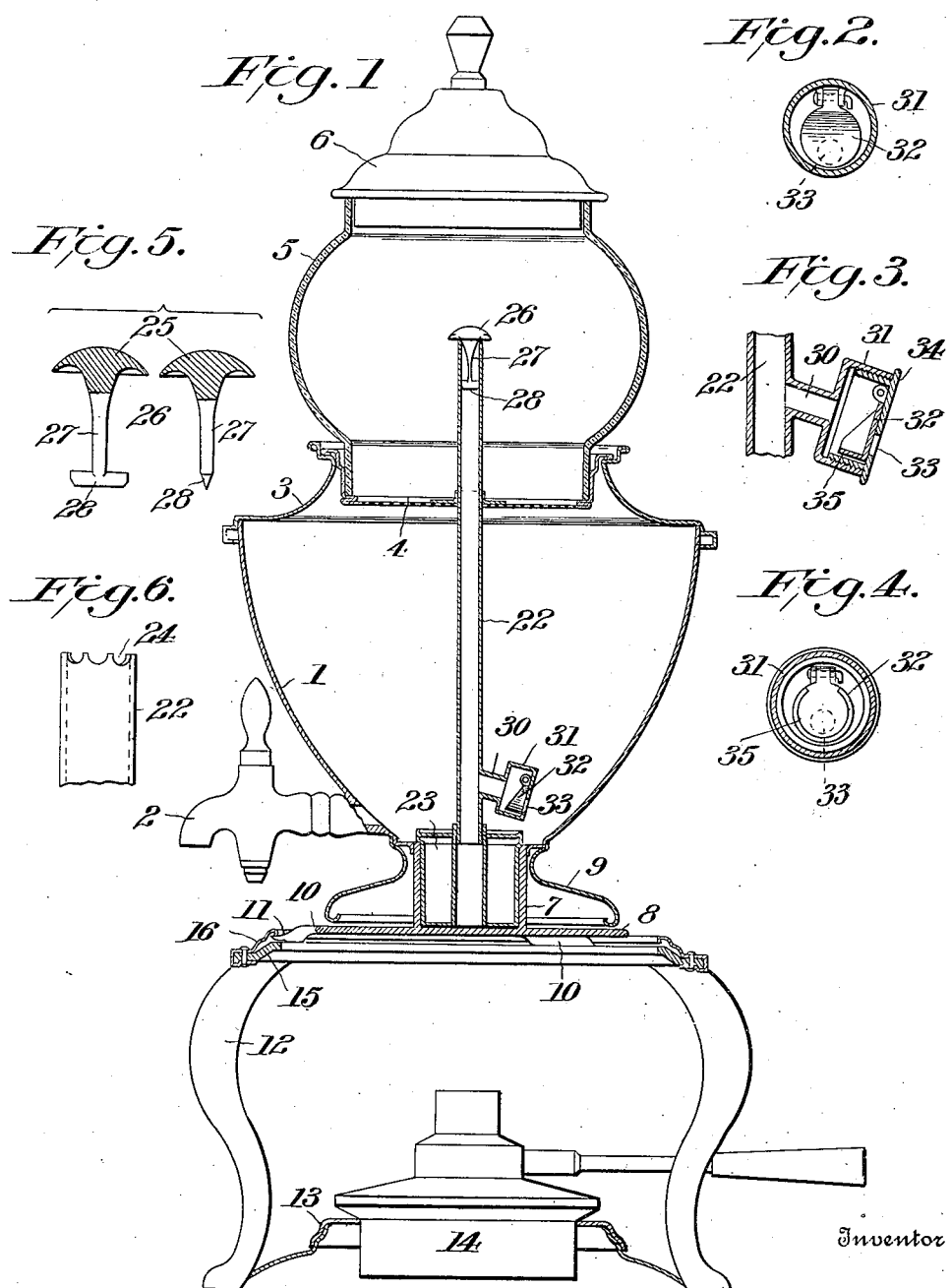

UNITED STATES PATENT OFFICE.

LOUIS WOJIDKOW, OF BROOKLYN, NEW YORK, ASSIGNOR TO NEW YORK STAMPING COMPANY, OF BROOKLYN, NEW YORK, A CORPORATION OF NEW YORK.

PERCOLATOR.

1,095,973.

Specification of Letters Patent.

Patented May 5, 1914.

Application filed October 17, 1912. Serial No. 726,397.

*To all whom it may concern:*

Be it known that I, LOUIS WOJIDKOW, a citizen of the United States, residing at Brooklyn, in the county of Kings and State of New York, have invented a certain new and useful Improvement in Percolators, of which the following is a full, clear, and exact description.

In the use of that class of coffee-making apparatus commonly known as "percolators", it is at present thought desirable to use cold water for preparing the infusion, and to bring it as rapidly as possible to such high temperature as will extract the essence from the ground coffee. In the best practice the water is not boiled, because of the supposed deleterious effects on the user, of boiled coffee, but the water must be so highly heated as to get a circulation. Various constructions of more or less complexity and ingenuity have been devised in recognition of these facts, some of which have met with popular approval.

The object of the present invention is to provide an efficient percolator of this character, of few parts, simple construction, easily cleaned, and capable of use by the most inexperienced coffee maker.

The principle of the invention is embodied in a reservoir having a heat conductor adjacent to a well in which is a percolator tube so constructed as to permit only a mere film of water to remain between itself and the adjacent heat conductor and separated from the fluid contents of the reservoir, so that the heat will flash this film into steam and thus insure a circulation of the water to make the desired coffee infusion. Connected with this arrangement are a spreader located at the top of the percolator tube to distribute the raised water over the ground coffee; an intermittent siphon for insuring the circulation of the water through the percolator tube; and means for air-cooling the parts so as to prevent external discoloration of the apparatus, especially when made of polished copper, all as I will proceed now more particularly to explain and finally claim.

In the accompanying drawings illustrating the invention, in the several figures of which like parts are similarly designated, Figure 1 is a vertical section illustrating one form of the percolator in connection with a lamp-stand for use on a table, part of the stand being shown in section and the remainder, including the lamp, in elevation. Fig. 2 is a cross-section, on a larger scale, of the valve-box of Fig. 1, showing the valve in rear elevation. Fig. 3 is a longitudinal section showing the valve mounted on a detachable cap, and Fig. 4 is a cross-section, like Fig. 2, of the valve-box of Fig. 3, showing the valve in rear elevation. Fig. 5 shows in two views, taken at right angles, the distributer or spreader detached and on a larger scale, with its mushroom head in cross-section. Fig. 6 is an elevation, on a larger scale, of the notched top of the percolator tube. Fig. 7 shows in elevation and partial section a percolator adapted for use on a range or stove. Fig. 8 is a sectional detail, and Fig. 9 is a fragmentary plan view, on a larger scale, illustrating the means for detachably connecting the percolator with its stand, as shown in Fig. 1.

Referring to that form of the invention where the percolator is designed for use on a table, in connection with a portable heating lamp, and as shown in Figs. 1, 8 and 9, 1 is the reservoir provided with a pouring faucet 2, and a breast 3, within which the sieve 4 is sustained. 5 is a glass vessel, open at both ends, and having one end adapted to fit in the sieve 4 and its other end adapted to receive a cover 6, all of which may be of any usual or approved construction.

The bottom of the reservoir 1 is provided with a relatively large well 7, having a laterally extended heating plate 8, which well and plate may be a single casting, or the two may be otherwise constructed. The reservoir and well are united or connected in any suitable water-tight way, preferably permanently. The plate 8 (also herein referred to as a heat conductor) is of sufficient diameter to receive the flame from the lamp, so that it will not impinge directly upon the reservoir. In order to conceal the well and obscure the plate and to enhance the symmetry of the percolator, an ornamental shell 9, of metal like that of the reservoir, is fixed to the reservoir at its upper end, with its lower end of less diameter than the plate, and it is spaced from the plate and well sufficiently to insure air-circulating spaces, so that the heat or flame from the lamp will not tarnish or discolor the shell and reservoir, thus permitting the use of copper and like discolorable metals in making these parts.

The plate 8 when used on a percolator designed for use on a stand, as shown in Figs. 1, 8 and 9, is provided in any suitable manner with a number, usually three, feet 10, of any ornamental configuration, having projections 11. The stand may be composed of legs 12, a connecting cross-bracket 13, which also supports the lamp 14, and a top ring 15, and the projections 11 rest upon this ring. This ring is surmounted by an annular shell 16, riveted or otherwise fixed to it, and notched, at 17, as shown in Fig. 9, in as many places as there are projections 11, so that the percolator may be safely secured to the stand by dropping its projections through the notches onto the ring and then turning the percolator so that its said projections 11 will pass under the unnotched portions of the shell 16, sufficient space being left between the ring and the overhang of the shell to house these projections and thus lock the percolator to its stand, while admitting of its detachment by a reverse operation.

It is to be noted that in the preferred construction, the feet slant downward from the plate and there is a free space between the plate and the stand all around, whereby air may circulate and thus minimize the heat radiation that would otherwise tend to discolor the metal of the percolator and stand.

As shown in Fig. 7, when the percolator is to be used on a stove or range, the feet may be omitted. In such case, also, the faucet may be replaced by a spout 18 and a handle 19, and the breast may be extended as at 20 to replace the glass, while the top or cover 21 may be of glass. Otherwise this percolator may be like that previously described and as hereinafter described.

The percolator tube 22 is connected at its lower end with a plug 23, two forms of which plug are here shown, although it may be otherwise modified within the principle of the invention. Referring to Fig. 1, this plug is made hollow and of substantially the same dimensions as the well and adapted to fit closely within the well with its entire bottom surface in substantial contact with the bottom of the well. The tube 22 is open at both ends, its upper end having a series of notches 24 to provide for the escape of the water beneath the weighted mushroom top 25 of the distributer or spreader 26, shown detached in Fig. 5. A stem 27 extends from the distributer top 25 and ends in a cross-arm 28 adapted to fit within the tube and hold the distributer within the tube while admitting of its loose play therein to accommodate itself to the pressure of the outflowing fluid. The concave under surface of the top 25 rests upon and only partially closes the upper end of the tube and directs the outflowing fluid laterally and downwardly upon the ground coffee in the sieve 4, and the numerous notches 24 insure a wide distribution of the fluid under the mushroom top, so that every portion of the coffee is exposed to the fluid and the production of the infusion hastened.

Instead of a hollow plug, I may use a solid plug 29, Fig. 7, and instead of its entirely filling the well, as in Fig. 1, it may fill only its lower portion. But it is considered advisable to have the bottom of the plug of the same superficial area as and parallel with the bottom of the well, so that when the plug is placed in the well with its bottom fitting closely to the bottom of the well the fluid will be displaced excepting to the extent of a mere film between the bottom of the plug and the bottom of the well, in order that there may be the least possible quantity of fluid to be raised to a degree of heat necessary to put the fluid in circulation. Theoretically, at least, this film of water is flashed into steam and thus circulation pressure is instantly obtained without raising the body of fluid to a boiling point. It is generally considered that boiled coffee is physically injurious, and hence the provision for avoiding boiling. It is also generally considered desirable to use cold water in starting the coffee making, and hence the quicker circulation is established the more rapidly is the fluid heated and the desired infusion obtained. The limitation of the supply of water at the point of greatest heat to a mere film, insures speedy circulation.

In order to convert the percolator tube 22 into a sort of siphon for insuring circulation of the fluid, there is arranged as near to the plug thereof as possible and communicating with the percolator tube above the plug, a downwardly and outwardly inclined lateral branch 30 provided with a valve-box 31 in which is arranged a valve 32, preferably a flap valve, covering the part 33 in the valve-box and opening into the reservoir. This valve-box and its valve may be of a variety of constructions, but it is preferred to arrange it in such way that access may be had to its interior for cleaning and repair, and such construction is shown in Fig. 3, where the box is provided with a removable closure 34 which may carry the valve, so that by detaching the closure the valve may be disconnected, and thus access had to the valve as well as to the interior of the valve-box. The port 33 preferably is located out of line with the lateral branch 30. The valve 32 may be a disk provided with a beveled counterweight 35 on its back, this counterweight increasing the pressure-area of the valve and serving to insure the normal closing of the port 33 by the valve, and also serving as a stop to limit the extent of opening by coming into contact with the rear wall of the box, thereby not only limiting the extent of opening of the valve but also preventing the dislocation of the valve.

It will be understood that when water is placed in the reservoir and ground coffee in the sieve and the parts assembled as shown in Fig. 1, the insertion of the plug 23 in the well will displace the water that is in the well excepting for the previously mentioned film between the bottom of the plug and the bottom of the well, separated from the contents of the reservoir, and the column of water that rises within the percolator tube to the height of the water in the reservoir. Heat being applied to the plate 8 it soon becomes sufficiently hot and its heat transmitted to the well to quickly raise the temperature of this separated film of water, so as to create a pressure that will exert its force against the column of water in the percolator tube, and cause it to overflow at the top. The valve 32, having been held to its seat by the pressure in the tube will then open and admit a fresh supply of water into the percolator tube, which in turn is heated and expelled, and so the circulation continues as long as heat is applied, the water being circulated through said tube and the coffee in the sieve until the desired infusion is obtained.

Starting with a mere separated film of water, which is almost immediately vaporized by the heat of the lamp, or flashed into steam, it is possible to use cold water in the first instance in the making of coffee and to raise the temperature of this water very rapidly and to get the coffee infusion in a very short time; and all of these features are at the present date considered essentials in percolators for table use.

In both forms of plug the tubular continuation of tube 22 through the plug is of greater diameter than the main body of said tube above the plug. By this provision percolation takes place sooner and with more strength than were the tube of the same diameter throughout. Nevertheless it is within my invention to use a percolator tube of uniform diameter.

It will be noticed that the construction is of great simplicity, with no complicated parts to be assembled and no parts likely to get out of order.

As already sufficiently indicated, the percolator tube used in the stove or range percolator shown in Fig. 7 is of essentially the same construction and mode of operation as that already described in connection with the percolator shown in Fig. 1.

It will also be noticed that the well is of large dimensions, and this is highly desirable for the convenience of the user in cleaning. It is not liable to accumulate refuse in an inaccessible way.

In percolators of large size, the spreader or distributer at the top of the percolator tube may be omitted.

It is to be observed that within the scope of the following claims, various changes in details of construction, and arrangement of parts are possible.

What I claim is:—

1. In a percolator, a reservoir having a well in its bottom, and a heating plate at the bottom of said well, combined with a percolator tube having a bottom plug adapted to fit in said well and displace the fluid therefrom excepting a film of such fluid between the bottom of the plug and the adjacent bottom of the well, so that a minimum quantity of fluid is exposed directly to the heat to insure instant flashing of such fluid into steam and thereby accelerate circulation of the fluid through the reservoir and percolator tube, and a branch pipe projecting laterally into the reservoir from the percolator tube and communicating directly with the percolator tube above the plug and provided at its outer end, away from the percolator tube, with an automatic valve adapted to respond to variations in pressure in the percolator tube to admit the fluid from the reservoir into the percolator tube when the film of fluid beneath the plug has been vaporized, thereby insuring rapid circulation of the fluid through the percolator tube.

2. In a percolator, a reservoir having a bottom heating plate and feet on said plate projecting therefrom, combined with a stand having a supporting ring provided with an annular overhanging notched shell spaced therefrom to receive and engage the feet projecting from the reservoir.

3. In a percolator, a reservoir having a bottom heating plate and feet projecting from said plate, combined with a stand having a supporting ring on which the feet are adapted to rest, and an annular shell applied to said ring and overhanging it and spaced therefrom, said shell having notches through which the feet may pass to rest upon the ring and on which ring the feet may be turned so as to position them under the unnotched portion of the annular shell and thereby secure the reservoir to the stand.

4. In a percolator, a reservoir having a well in its bottom and a heating plate at the bottom of said well, combined with a percolator tube having a bottom plug adapted to fit said well and displace the fluid therefrom excepting a film of such fluid between the bottom of the plug and the adjacent bottom of the well, and a downwardly and outwardly inclined lateral branch communicating with the percolator tube above the plug and provided with a valve-box having an inclined valve seat, a valve therein and a port opening from said box into the reservoir.

5. In a percolator, a reservoir having a well in its bottom and a heating plate at the bottom of said well, combined with a percolator tube having a bottom plug adapted to fit said well and displace the fluid therefrom excepting a film of such fluid between the bottom of the plug and the adjacent bottom of the well, and a downwardly and outwardly inclined lateral branch communicating with the percolator tube above the plug and provided with a valve-box having an inclined valve seat, a valve therein and a port opening from said box into the reservoir, said port arranged out of alinement with the lateral branch.

6. In a percolator, a reservoir having a well in its bottom, and a heating plate at the bottom of said well, combined with a percolator tube having a bottom plug adapted to fit in said well and displace the fluid therefrom excepting a film of such fluid between the bottom of the plug and the adjacent bottom of the well, and a valve and a box therefor arranged in said reservoir outside of and connected and communicating directly with the percolator tube above the plug and controlling communication between said tube and the reservoir, whereby a minimum quantity of fluid is exposed directly to the heat to insure instant flashing of such fluid into steam and thereby accelerate circulation of the fluid through the reservoir and percolator tube.

7. In a percolator, a reservoir having a well at its bottom opening into the reservoir, a heating plate extending laterally from the well and forming its bottom, and a shell of the same material as the reservoir applied at its upper end to the reservoir and extending downwardly toward the heating plate and terminating above said plate and within its periphery.

8. In a percolator, a reservoir having a well at its bottom opening into the reservoir, a heating plate extending laterally from the well and forming its bottom, and a shell of the same material as the reservoir applied at its upper end to the reservoir and extending downwardly toward the heating plate and of less diameter at its bottom than the heating plate, and terminating above the heating plate, thereby providing an air space around the well and between itself and the heating plate, whereby said shell is protected from injurious exposure to the heat or flame of the lamp or other heater.

In testimony whereof I have hereunto set my hand this 16th day of October A. D. 1912.

LOUIS WOJIDKOW.

Witnesses:
R. W. SHELTER,
FRED C. WOJIDKOW.

---

Copies of this patent may be obtained for five cents each, by addressing the "Commissioner of Patents, Washington, D. C."